United States Patent
Lin

(10) Patent No.: US 8,289,604 B2
(45) Date of Patent: Oct. 16, 2012

(54) OPTICAL PATH CONTROL DEVICE

(75) Inventor: Guo-Quan Lin, Taichung (TW)

(73) Assignee: Asia Optical International Ltd., Tortola (VG)

( * ) Notice: Subject to any disclaimer, the term of this patent is extended or adjusted under 35 U.S.C. 154(b) by 284 days.

(21) Appl. No.: 12/862,108

(22) Filed: Aug. 24, 2010

(65) Prior Publication Data

US 2011/0075235 A1 Mar. 31, 2011

(30) Foreign Application Priority Data

Sep. 25, 2009 (TW) ................. 98132599 A

(51) Int. Cl.
*G02B 26/10* (2006.01)

(52) U.S. Cl. ................. 359/221.3; 359/226.1

(58) Field of Classification Search ..... 359/196.1–226.2
See application file for complete search history.

(56) References Cited

U.S. PATENT DOCUMENTS

| 6,509,996 | B2 | 1/2003 | Stokes | |
|---|---|---|---|---|
| 7,388,706 | B2* | 6/2008 | Miles | 359/291 |
| 2002/0163701 | A1* | 11/2002 | Plesko | 359/199 |
| 2006/0132881 | A1* | 6/2006 | Kim | 359/196 |
| 2007/0053035 | A1* | 3/2007 | Cho et al. | 359/201 |

* cited by examiner

*Primary Examiner* — Frank Font
(74) *Attorney, Agent, or Firm* — Thomas|Kayden

(57) ABSTRACT

An optical path control device is provided, including a fixed reflective mirror fixed on a first position at a fixed angle for an incident light to be reflected thereon, and a rotatable reflective mirror driven by a driving device and rotated on a fixed axle. A surface of the rotatable reflective mirror is perpendicular to the fixed axle. The axle is disposed at a second position so that a rotating path of the rotatable reflective mirror passes through the incident light reflected on the fixed reflective mirror. A normal line of an incident point of the rotatable reflective mirror where the incident light enters, and a normal line of an incident point of the fixed reflective mirror where the incident light enters generates a predetermined included angle.

7 Claims, 4 Drawing Sheets

OPTICAL PATH CONTROL DEVICE

CROSS REFERENCE TO RELATED APPLICATIONS

This Application claims priority of Taiwan Patent Application No. 098132599, filed on Sep. 25, 2009, the entirety of which is incorporated by reference herein.

BACKGROUND OF THE INVENTION

1. Field of the Invention

The present invention relates to an optical apparatus, and more particularly, to an optical path control device for controlling the direction of light.

2. Description of the Related Art

One type of technology, important in everyday lives of humans, is optical technology. Many products which apply optical technology include, for example, LCD TVs, PDP TVs, and laser TVs. Optical path control is an important challenge in optical projection.

In existing optical path control area, U.S. Pat. No. 6,509,996 discloses an optical path control device. The optical path control device includes a flat mirror on an output axle of a servo motor to provide light, for example a laser, for reflection thereon. The servo motor rotates the flat mirror to change the incident angle of light reflected thereon.

The optical path control device further includes an angle sensor for detecting and reporting the angle state of the flat mirror to a servo circuit controlling the servo motor. Thus, the servo circuit may precisely control the servo motor to ensure that the flat mirror has an exact angle position. However, design of the above optical path control device is complex and fabrication costs are high.

Furthermore, a servo motor rotates clockwise or counterclockwise at a predetermined angle to make the flat mirror suddenly arrive a predetermined position. Thus, the servo motor is suddenly started or stopped, resulting in vibration. Vibration decreases the light projection efficiency of the flat mirror applying the optical path control device.

According to requirement of the optical path control, in some embodiments, an incident light is reflected a few times at a constant angle. For example, the incident light, a laser, is reflected repeatedly and regularly at two different angles. According to the above requirement, to use the optical path control device brings high fabrication costs and poor reflection efficiency.

BRIEF SUMMARY OF THE INVENTION

The present invention provides an optical path control device having high reflection efficiency.

In order to achieve the purpose of the invention, the invention provides a fixed reflective mirror disposed on a first position at a constant angle. An incident light is reflected thereon. The optical path control device further comprises a rotatable reflective mirror, which is a flat mirror, driven by a driving device and rotated on a fixed axle. The surface of the rotatable reflective mirror is perpendicular to the fixed axle. The axle is disposed at a second position to make a rotating path of the rotatable reflective mirror pass through the incident light reflected on the fixed reflective mirror. A normal line of an incident point of the rotatable reflective mirror where the incident light enters, and a normal line of an incident point of the fixed reflective mirror where the incident light enters generate a predetermined included angle.

Thus, when the incident light enters the fixed reflective mirror at a predetermined angle, a first reflecting light with a first angle is generated on the fixed reflective mirror. When the rotatable reflective mirror is driven by the driving device to rotate the incident light, a second reflecting light with a second angle from the incident light is generated on the rotatable reflective mirror. Because the driving device continuously drives the rotatable reflective mirror for rotation, the incident light is repeatedly reflected between the fixed reflective mirror and the rotatable reflective mirror according to a time sequence. Thus, the first reflecting light and the second reflecting light are repeatedly generated on the fixed reflective mirror and the rotatable reflective mirror.

Because the first reflecting light and the second reflecting light are repeatedly generated via the rotation of the driving device with the same direction, the driving device is not suddenly started or stopped. Thus, vibration is prevented and reflection efficiency is improved when compared to prior art.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The present invention can be more fully understood by reading the subsequent detailed description and examples with references made to the accompanying drawing.

Figure 1:
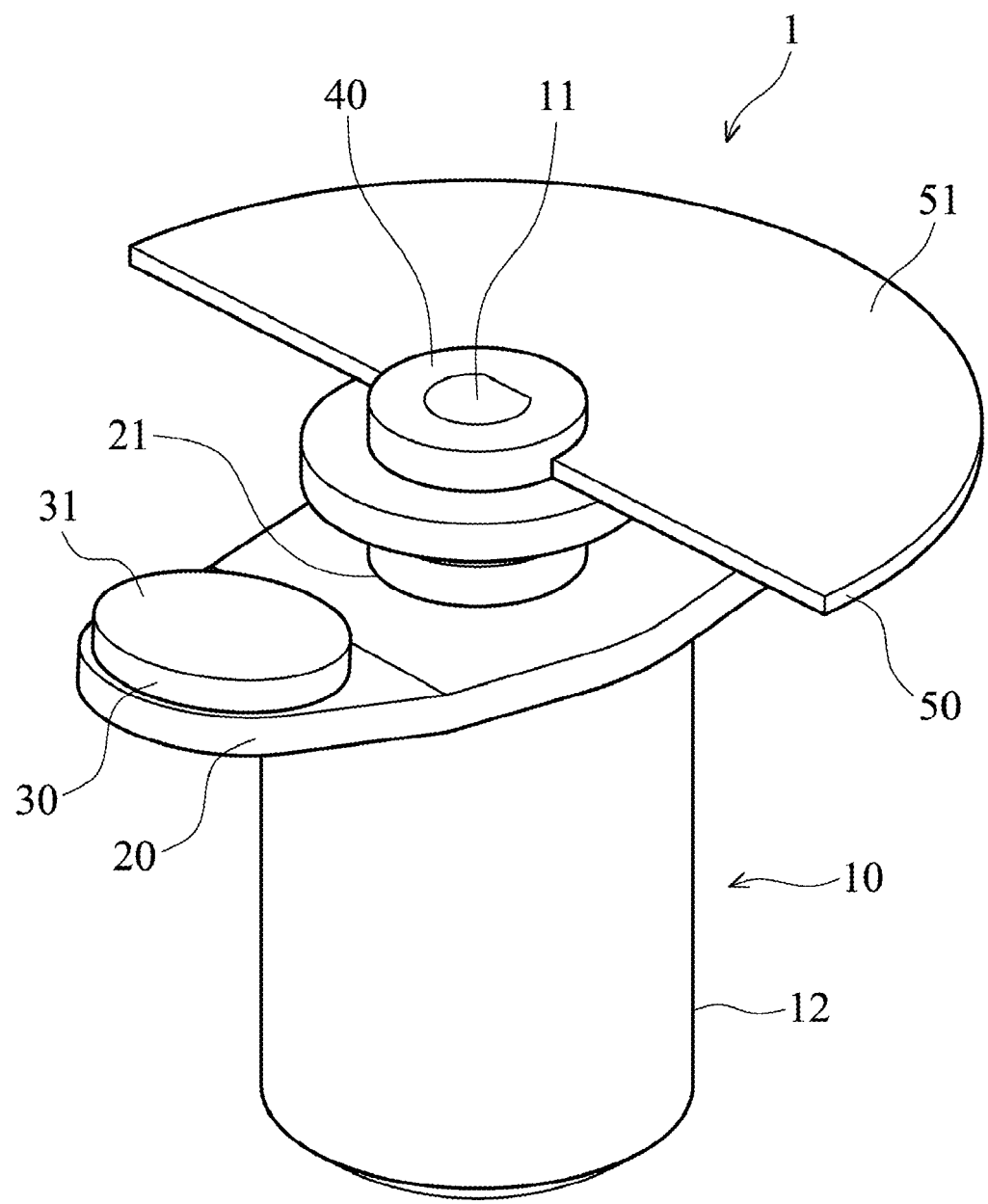
FIG. 1 is a schematic view of an embodiment of the invention.
Figure 2:
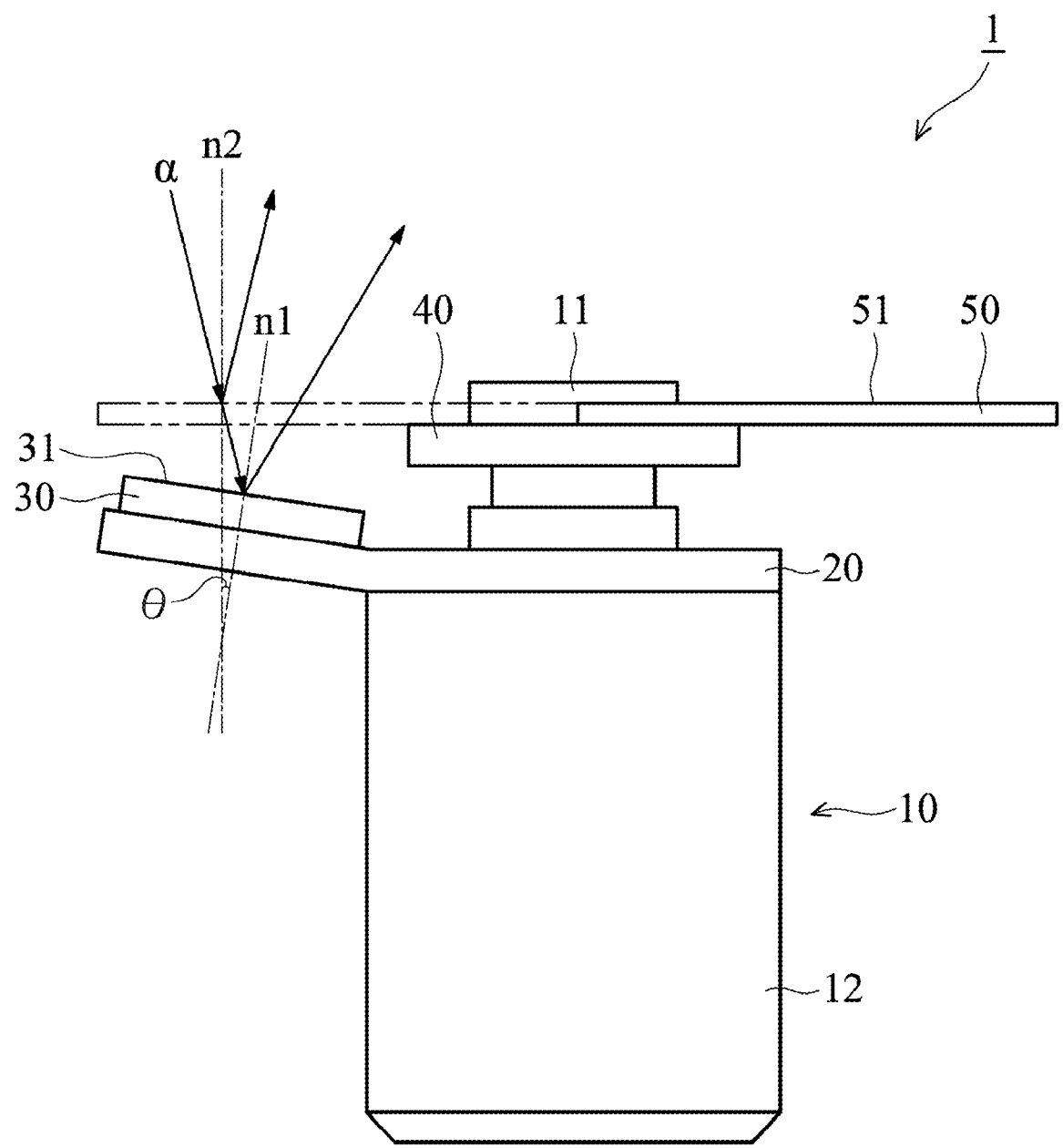
FIG. 2 is a lateral view of an embodiment of the invention in FIG. 1.

Referring to FIGS. 1 and 2, an optical path control device 1 comprises a driving device to for rotation. In this embodiment, the driving device is a motor 10. The motor has an output axle 11.

The optical path control device 1 comprises a holder 20 fixed on a shell 12 of the motor 10. The holder 20 comprises a through hole 21 for the output axle 11 of the motor 10 to pass therethrough.

The optical path control device 1 comprises a fixed reflective mirror 30. The fixed reflective mirror 30 is a flat mirror fixed on the holder 20 to provide an incident light α that is reflected on the surface 31 thereof. The fixed reflective mirror 30 is disposed on one side of the output axle 11 of the motor 10. The surface 31 is inclined at a predetermined angle to the output axle 11.

The optical path control device 1 comprises a sleeve 40 disposed on the output axle 11 of the motor 10 and rotated with the output axle 11. The sleeve 40 partly passes through the through hole 21 of the holder 20.

The optical path control device 1 comprises a rotatable reflective mirror 50. The rotatable reflective mirror 50 is a flat mirror fixed on the sleeve 40 and rotated with the output axle 11 of the motor 10. A rotating path of the rotatable reflective mirror 50 passes through the incident light α that is reflected on the fixed reflective mirror 30. A surface 51 of the rotatable reflective mirror 50 is perpendicular to the output axle 11. Thus, an included angle is generated between the surface 51 of the rotatable reflective mirror 50 and the surface 31 of the fixed reflective mirror 30. A normal line n2 of an incident point of the rotatable reflective mirror 50 where the incident light α enters, and a normal line n1 of an incident point of the fixed reflective mirror 30 where the incident light α enters generate a predetermined included angle θ.

Figure 3:
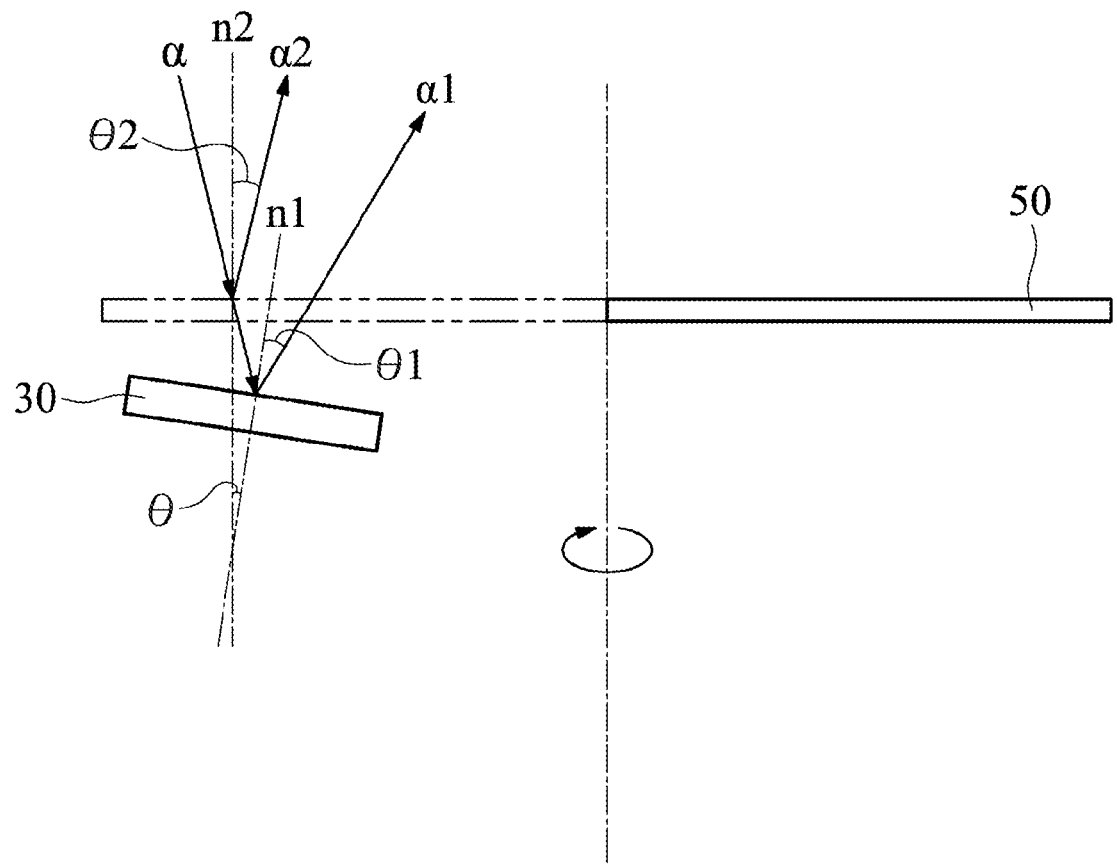
FIG. 3 is a schematic view showing an optical path of FIG. 1.

Referring to FIGS. 2 and 3, when the incident light α is reflected at a predetermined included angle on the fixed reflective mirror 30, the fixed reflective mirror 30 generates a first reflecting light α 1 with a first reflecting angle θ 1. When the rotatable reflective mirror 50 is driven by the motor 10 to rotate and pass through the incident light a, the incident light α generates a second reflecting light α 2 with a second reflecting angle θ 2. The first reflecting angle θ 1 equals to the second reflecting angle θ 2 plus the predetermined included angle θ between the normal line n1 of an incident point of the fixed reflective mirror 30 and the normal line n2 of an incident point of the rotatable reflective mirror 50. The formula is as follows:

$$\theta 1 = \theta 2 + \theta$$

Figure 4:
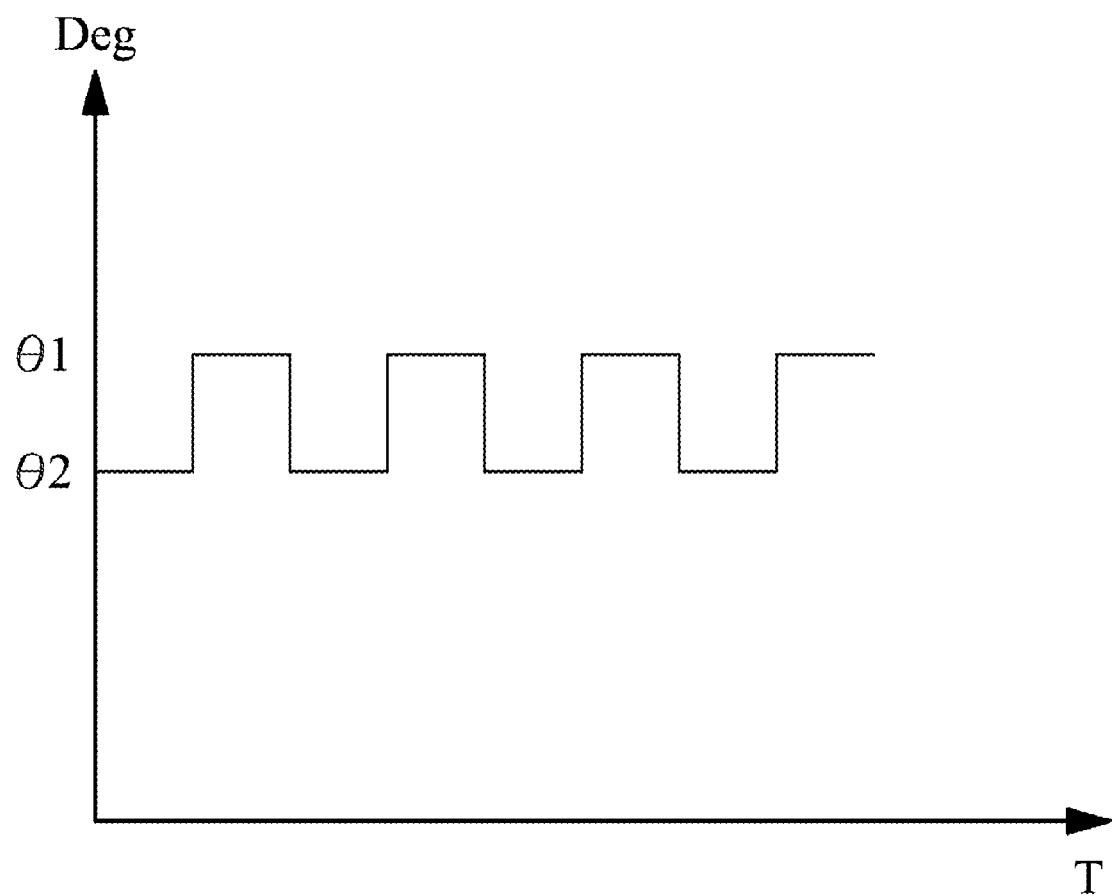
FIG. 4 is a relationship chart of a reflected light angle and time of FIG. 1.

Because the motor 10 continuously drives the rotatable reflective mirror 50 for rotation according to a constant speed, the incident light α is repeatedly reflected between the fixed reflective mirror 30 and the rotatable reflective mirror 50 according to a time sequence. Thus, the first reflecting light α 1 and the second reflecting light α 2 are repeatedly generated on the fixed reflective mirror 30 and the rotatable reflective mirror 50. The relationship between the first reflecting angle θ 1 and the second reflecting angle θ 2 of the first reflecting light α 1 and the second reflecting light α 2 is shown in FIG. 4. Referring to FIG. 4, the first reflecting angle θ 1 and the second reflecting angle θ 2 of the first reflecting light α 1 and the second reflecting light α 2 varies discontinuously.

Because the first reflecting light α 1 and the second reflecting light α 2 are repeatedly generated via the rotation of the motor 10 with the same direction, the motor 10 is not suddenly started or stopped. Thus, vibration is prevented and reflection efficiency is improved when compared to prior art. Further, because the motor 10 is not suddenly started or stopped, and rotated clockwise and counter-clockwise while changing optical paths by the optical path control device 1, the speed of changing the optical path increases substantially. Finally, the structure of the optical path control device 1 is simple and does not require a complex angle sensor and control circuit. Thus, costs are decreased and operating efficiency is increased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical path control device, comprising:
    a driving device, outputting a rotating power;
    a fixed reflective mirror, fixed on a first position, wherein an incident light is reflected on the fixed reflective mirror;
    a rotatable reflective mirror, which is flat, comprising a surface, wherein the rotatable reflective mirror is driven by the driving device and rotated on a fixed axle, the surface of the rotatable reflective mirror is perpendicular to the fixed axle, the fixed axle is disposed on a second position, a rotating path of the rotatable reflective mirror passes through the incident light reflected on the fixed reflective mirror, and a normal line of an incident point of the rotatable reflective mirror where the incident light enters, and a normal line of an incident point of the fixed reflective mirror where the incident light enters generates a predetermined included angle.

2. The optical path control device as claimed in claim 1, wherein the driving device is a motor.

3. The optical path control device as claimed in claim 2, wherein the motor comprises an output axle, the rotatable reflective mirror is connected to the output axle and driven by the output axle, and the surface of the rotatable reflective mirror is perpendicular to the output axle.

4. The optical path control device as claimed in claim 3, further comprising a sleeve disposed on the output axle and rotated with the output axle, wherein the rotatable reflective mirror is fixed on the sleeve and connected to the output axle.

5. The optical path control device as claimed in claim 3, further comprising a holder fixed on a shell of the motor, wherein the fixed reflective mirror is disposed on the holder and located on one side of the output axle of the motor.

6. The optical path control device as claimed in claim 5, wherein the holder comprises a through hole for the output axle of the motor to pass therethrough, and the surface of the fixed reflective mirror is inclined at a predetermined angle to the output axle, and a part of the sleeve passes through the through hole of the holder.

7. The optical path control device as claimed in claim 1, wherein the fixed reflective mirror is a flat mirror.

* * * * *